(12) United States Patent
Kolb et al.

(10) Patent No.: US 8,530,572 B2
(45) Date of Patent: *Sep. 10, 2013

(54) BRIGHTNESS ENHANCING FILM COMPRISING NANOCOMPOSITE STRUCTURE HAVING IMPROVED CRACK RESISTANCE

(75) Inventors: Brant U. Kolb, Afton, MN (US); Clinton L. Jones, Somerset, WI (US); David B. Olson, Marine on St. Croix, MN (US); Taun L. McKenzie, Hugo, MN (US); Nathan K. Naismith, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,382

(22) Filed: Jun. 27, 2012

(65) Prior Publication Data

US 2012/0264899 A1    Oct. 18, 2012

Related U.S. Application Data

(63) Continuation of application No. 12/527,948, filed as application No. PCT/US2008/055058 on Feb. 27, 2008, now abandoned.

(60) Provisional application No. 60/891,812, filed on Feb. 27, 2007, provisional application No. 60/912,751, filed on Apr. 19, 2007, provisional application No. 60/891,840, filed on Feb. 27, 2007, provisional application No. 60/917,827, filed on May 14, 2007.

(51) Int. Cl.
*C08K 3/10* (2006.01)
*C08G 61/10* (2006.01)

(52) U.S. Cl.
USPC ............ 524/783; 252/585; 359/599; 428/1.1; 428/1.3; 428/1.33; 428/1.51; 428/1.54; 428/147; 428/148; 523/202; 523/210; 524/413; 524/556; 524/559; 977/773

(58) Field of Classification Search
USPC ................. 359/599; 428/1.1, 1.3, 1.33, 1.51, 428/1.54, 147, 148; 523/202, 210; 524/556, 524/559, 783, 413; 977/773; 252/585
See application file for complete search history.

(56) References Cited

U.S. PATENT DOCUMENTS

| | | |
|---|---|---|
| 4,306,780 A | 12/1981 | Tarumi |
| 4,458,006 A | 7/1984 | Doenges et al. |
| 4,518,756 A | 5/1985 | Yoshida et al. |
| 4,576,850 A | 3/1986 | Martens |
| 4,650,719 A | 3/1987 | Dien et al. |
| 5,183,917 A | 2/1993 | Maruyama et al. |
| 5,334,681 A | 8/1994 | Mueller et al. |
| 5,453,452 A | 9/1995 | Nakayama et al. |
| 5,626,800 A | 5/1997 | Williams et al. |
| 5,629,445 A | 5/1997 | Nakayama et al. |
| 5,716,740 A | 2/1998 | Shiba et al. |
| 5,855,983 A | 1/1999 | Williams |
| 5,908,874 A | 6/1999 | Fong et al. |
| 6,458,908 B1 | 10/2002 | Imai et al. |
| 6,656,990 B2 | 12/2003 | Shustack et al. |
| 6,844,950 B2 | 1/2005 | Ja Chisholm et al. |
| 7,074,463 B2 | 7/2006 | Jones et al. |
| 7,169,375 B2 | 1/2007 | Chisholm |
| 7,309,517 B2 | 12/2007 | Jones et al. |
| 7,524,543 B2 | 4/2009 | Jones et al. |
| 7,547,467 B2 | 6/2009 | Olson et al. |
| 7,622,164 B2 | 11/2009 | Jones et al. |
| 2002/0123589 A1 | 9/2002 | Olson et al. |
| 2003/0021566 A1 | 1/2003 | Shustack et al. |
| 2003/0100693 A1 | 5/2003 | Olson et al. |
| 2004/0131826 A1 | 7/2004 | Chisholm et al. |
| 2004/0233526 A1 | 11/2004 | Kaminsky et al. |
| 2005/0049325 A1 | 3/2005 | Chisholm et al. |
| 2005/0063898 A1 | 3/2005 | Ja Chisholm |
| 2005/0136252 A1 | 6/2005 | Chisholm et al. |
| 2006/0128853 A1 | 6/2006 | Olson |
| 2006/0147703 A1 | 7/2006 | Walker, Jr. et al. |
| 2006/0210726 A1 | 9/2006 | Jones |
| 2006/0261318 A1 | 11/2006 | Morimoto et al. |
| 2007/0112097 A1* | 5/2007 | Olson et al. ................... 523/210 |
| 2008/0221291 A1 | 9/2008 | Invie et al. |

(Continued)

FOREIGN PATENT DOCUMENTS

| | | |
|---|---|---|
| EP | 0109073 | 5/1984 |
| EP | 1057808 | 6/2000 |

(Continued)

OTHER PUBLICATIONS

62798WO010 Intl Search Report (PCT/US2008/055058).

(Continued)

*Primary Examiner* — David W Wu
*Assistant Examiner* — Marie Reddick
(74) *Attorney, Agent, or Firm* — Carolyn A. Fischer

(57) ABSTRACT

Microstructured films such as brightness enhancing films, polymerizable resin compositions comprising an organic component and surface modified nanoparticles, and surface modified nanoparticles are described. The microstructured film has a polymerized structure comprising the reaction product of the polymerizable resin composition (e.g. having a refractive index of at least 1.58). The cured nanocomposite (e.g. structure) can exhibit improved crack resistance. In some embodiments, the flexibility is expressed in terms of a cylindrical mandrel bend test property (e.g. a mandrel size to failure of less than 6 mm or a mandrel size to failure according to the equation $D=1000(T/0.025-T)$ wherein T is the thickness in millimeters of a (e.g. preformed base layer). In other embodiments, the flexibility is expressed in terms of a tensile and elongation property (e.g. a tensile strength at break of at least 25 MPa and an elongation at break of at least 1.75%).

20 Claims, No Drawings

(56) References Cited

U.S. PATENT DOCUMENTS

| | | |
|---|---|---|
| 2009/0047486 A1 | 2/2009 | Jones et al. |
| 2009/0176061 A1 | 7/2009 | Jones et al. |
| 2009/0246417 A1 | 10/2009 | Jones et al. |

FOREIGN PATENT DOCUMENTS

| | | |
|---|---|---|
| EP | 1455200 | 9/2004 |
| JP | 59-86615 | 5/1984 |
| JP | 61127712 | 6/1986 |
| JP | 7-316245 | 12/1995 |
| JP | 08-217991 | 8/1996 |
| JP | 09-272707 | 10/1997 |
| JP | 11-349615 | 12/1999 |
| JP | 2000-123456 | 4/2000 |
| JP | 3397448 | 4/2003 |
| JP | 2003-160614 | 6/2003 |
| JP | 2004-231704 | 8/2004 |
| JP | 2004-323557 | 11/2004 |
| JP | 2005-272773 | 10/2005 |
| JP | 2005-283632 | 10/2005 |
| WO | WO 00/34804 | 6/2000 |
| WO | WO 01/30702 | 5/2001 |
| WO | WO 02/062881 | 8/2002 |
| WO | WO 2006/007286 | 1/2006 |

OTHER PUBLICATIONS

Beilstein Institute for Organic Chemistry, Beilstein Registry No. 3557396, © 2007-2008; XP002496691.

Beilstein Institute for Organic Chemistry, Beilstein Registry No. 5994137, © 2007-2008; XP002496692.

Beilstein Institute for Organic Chemistry, Beilstein Registry No. 2917342, © 2007-2008; XP002496693.

Beilstein Institute for Organic Chemistry, Beilstein Registry No. 2922680, © 2007-2008; XP002496694.

* cited by examiner

BRIGHTNESS ENHANCING FILM COMPRISING NANOCOMPOSITE STRUCTURE HAVING IMPROVED CRACK RESISTANCE

CROSS-REFERENCE TO RELATED APPLICATIONS

This application is a continuation of application Ser. No. 12/527,948, filed Feb. 27, 2008, now abandoned, which is a national stage filing under 35 U.S.C. 371 of PCT/US2008/055058, filed Feb. 27, 2008, which claims priority to Provisional Application Nos. 60/891,812, filed Feb. 27, 2007, 60/912,751, filed Apr. 19, 2007, 60/891,840, filed Feb. 27, 2007 and 60/917,827, filed May 14, 2007, the disclosures of which are incorporated by reference in their entirety herein.

BACKGROUND

Certain microreplicated optical products, such as described in U.S. Pat. Nos. 5,175,030 and 5,183,597, are commonly referred to as a "brightness enhancing films". Brightness enhancing films are utilized in many electronic products to increase the brightness of a backlit flat panel display such as a liquid crystal display (LCD) including those used in electroluminescent panels, laptop computer displays, word processors, desktop monitors, televisions, video cameras, as well as automotive and aviation displays.

Brightness enhancing films desirably exhibit specific optical and physical properties including the index of refraction of a brightness enhancing film that is related to the brightness gain (i.e. "gain") produced. Improved brightness can allow the electronic product to operate more efficiently by using less power to light the display, thereby reducing the power consumption, placing a lower heat load on its components, and extending the lifetime of the product.

Brightness enhancing films have been prepared from high index of refraction monomers that are cured or polymerized.

Brightness enhancing films have been prepared from polymerizable resin compositions comprising inorganic particles, such as zirconia, silica, and titania, as described in U.S. Pat. No. 6,844,950; and U.S. Publication Nos. 2005/0059766; 2005/0151119; 2006/0204676; 2006/0204745; 2006/0210726, and 2006/0204745.

SUMMARY OF THE INVENTION

Presently described are microstructured films such as brightness enhancing films, polymerizable resin compositions comprising an organic component and surface modified nanoparticles, and surface modified nanoparticles. The microstructured film has a polymerized structure comprising the reaction product of the polymerizable resin composition (e.g. having a refractive index of at least 1.58). The cured nanocomposite (e.g. structure) can exhibit improved crack resistance.

In some embodiments, the polymerizable resin composition comprises at least 10 wt-% of surface modified inorganic nanoparticles and exhibits improved flexibility. In some embodiments, the flexibility is expressed in terms of a cylindrical mandrel bend test property (e.g. a mandrel size to failure of less than 6 mm or a mandrel size to failure according to the equation $D=1000(T/0.025-T)$ wherein T is the thickness in millimeters of a (e.g. preformed base layer). In other embodiments, the flexibility is expressed in terms of a tensile and elongation property (e.g. a tensile strength at break of at least 25 MPa and an elongation at break of at least 1.75%).

In one embodiment, the organic component of the polymerizable resin composition comprises at least one di(meth)acrylate aromatic monomer. In another embodiment, the surface modified inorganic nanoparticles comprise adsorbed non-reactive volatile acid. In one preferred embodiment, the polymerizable resin composition comprises 40 wt-% to 60 wt-% of surface modified inorganic nanoparticles and the nanoparticles have a refractive index of at least 1.68.

One preferred, polymerizable resin (e.g. of the polymerized structure of the brightness enhancing film) composition that can exhibit such flexibility comprises
an organic component comprising one or more ethylenically unsaturated monomer(s) or oligomer(s); and at least 10 wt-% inorganic nanoparticles surface modified with
 a first surface treatment comprising at least one monocarboxylic acid having a non-reactive compatibilizing group, and
 a second surface treatment comprising at least one non-volatile monocarboxylic acid having a copolymerizable group that reacts with the organic component;
wherein the nanoparticles comprise the second surface treatment in a stoichiometric amount that is greater than the first surface treatment.

Another preferred polymerizable resin composition that can exhibit such flexibility comprises an organic component comprising one or more monofunctional biphenyl monomers in an amount totaling at least 10 wt-% and at least 10 wt-% inorganic nanoparticles surface modified with
 a first surface treatment comprising at least one monocarboxylic acid having a water soluble tail, and
 a second surface treatment comprising at least one acrylate functionalized surface modifier prepared by the reaction of an aliphatic anhydride and a hydroxy alkyl acrylate.

In another embodiment, surface modified inorganic nanoparticles are described. The nanoparticle comprise a first surface treatment comprising at least one monocarboxylic acid having a non-reactive compatibilizing group and a second surface treatment comprising at least one non-volatile monocarboxylic acid having a copolymerizable group that reacts with the organic component. The nanoparticles comprise the second surface treatment in a stoichiometric amount that is greater than the first surface treatment.

DETAILED DESCRIPTION OF PREFERRED EMBODIMENTS

Brightness enhancing films generally enhance on-axis luminance (referred herein as "brightness") of a lighting device. Brightness enhancing films can be light transmissible, microstructured films. The microstructured topography can be a plurality of prisms on the film surface such that the films can be used to redirect light through reflection and refraction. The height of the prisms typically ranges from about 1 to about 75 microns. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

As described in U.S. Pat. No. 5,183,597 (Lu) and U.S. Pat. No. 5,175,030 (Lu et al.), a microstructure-bearing article (e.g. brightness enhancing film) can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master. One or more the surfaces of the base film can optionally be primed or otherwise be treated to promote adhesion of the optical layer to the base.

Presently described are polymerizable resin compositions for use in making optical (e.g. film) articles such as brightness enhancing films or other microstructured articles. The optical films comprise a polymerized structure comprising the reaction product of polymerizable resin comprising surface modified inorganic nanoparticles dispersed in an organic component.

As used herein "polymerizable composition" refers to the total composition including the organic component and surface modified inorganic nanoparticles. The "organic component" refers to all of the components of the composition except for the surface modified inorganic nanoparticles. Since the surface treatments are generally adsorbed or otherwise attached to the surface of the inorganic nanoparticles, the surface treatments are not considered a portion of the organic component. The wt-% of surface modified inorganic nanoparticles is greater than the concentration of the inorganic nanoparticles alone. It is typical for the wt-% of surface modified nanoparticles to be about 20% greater than the wt-% of the inorganic nanoparticles. For example, a composition comprising 40 wt-% of inorganic nanoparticles comprises about 56 wt-% surface modified inorganic nanoparticles.

The polymerized structure can be an optical element or optical product constructed of a base layer and an optical layer. The base layer and optical layer can be formed from the same or different polymer material.

Presently described are brightness enhancing films comprising a polymerized (e.g. prismatic) structure. The polymerized structure comprises the reaction product of a polymerizable resin composition having a (i.e. polymerizable) organic component and at least 10 wt-% of surface modified inorganic nanoparticles.

The tensile strength and elongation properties of a film are physical properties of the film material. Tensile Properties of Thin Plastic Sheeting is a standard test method as described in ASTM D882-02. Conventional film materials can be cut into (e.g. dog bone-shaped) specimens for testing. The tensile strength and elongation properties of UV cured homopolymers of certain (meth)acrylate monomers, such as aliphatic urethane diacrylate and triacrylates, is reported by the suppliers of such materials. Although the homopolymerization product of other types of monomers, such as various monofunctional (meth)acrylate monomers and (meth)acrylate crosslinkers often does not result in a film material suitable for tensile testing, the tensile strength and elongation of a film formed from a polymerizable mixture containing such materials can be measured.

The Applicant has found that the tensile strength and elongation properties of the polymerizable resin composition correlates to the crack resistance of the brightness enhancing film. The Applicant has discovered that by selecting a polymerizable resin composition having certain tensile strength and elongation properties, the crack resistance of a brightness enhancing film can be improved.

By use of tensile strength and elongation testing, many polymerizable resin compositions can quickly and conveniently screened without actually fabricating the polymerizable resin into a brightness enhancing film. The tensile strength and elongation is tested according to ASTM D 882-02 using the specified test specimen preparation and testing parameters set forth in the examples. Since only a small amount of test specimens are needed for testing, it is convenient to prepare individual test specimens by curing the polymerizable resin composition in a silicone mold. Silicone molds are also used to mold test specimens from materials that are difficult to handle such as pressure sensitive adhesive.

The polymerizable resin compositions suitable for use in making the polymerized structure of a brightness enhancing film described herein have a tensile strength at break of at least 25 MPa, 30 MPa, 35 MPa, 40 MPa, 45 MPa, or 50 MPa. The tensile strength at break typically does not exceed about 200 MPa. In some embodiments, the tensile strength is at least 55 MPa or 60 MPa. The polymerizable resin compositions also have an elongation at break of at least 1.75% or 2%. In some embodiments, the elongation is at least 2.5%, 3%, 3.5%, 4%, 4.5%, 5%, 5.5%, 6.0%, 6.5%, 7.0%, 7.5%, or 8%. The elongation is typically less than 20% and is some embodiments no greater than 15%.

Polymerizable resin compositions that are too "soft" may exhibit the described elongation property, yet have tensile values significantly below the target values just described. Conversely, polymerizable resin compositions that are too "hard" may exhibit the tensile strength properties, yet easily crack due to poor elongation properties. Polymerizable resin compositions that exhibit both the tensile strength and elongation criteria provide a synergistic balance of film hardness and flexibility.

The polymerizable resin compositions typically have a glass transition temperature (Tg) of at least 35° C., 40° C., or 45° C. The inclusion of the surface modified nanoparticles can raise the Tg of the polymerizable resin composition. Thus, the organic component can have a lower Tg than the (i.e. nanoparticle-containing) polymerizable resin composition. The dynamic tensile modulus of the polymerizable resin composition is typically at least $1 \times 10^9$ at about 20° C.

By utilizing polymerizable resin compositions having the tensile strength and elongation properties just described, the resulting brightness enhancing film exhibits improved crack resistance as measured according to a cylindrical mandrel bend test ISO 1519:2002(E). The mandrel size to failure (i.e. the mandrel size that results in cracking of the polymerized structures of the brightness enhancing) is less than 6 mm, 5 mm, or 4 mm. In some embodiments, no cracking is evident with a mandrel size of 3 mm or 2 mm. Although aging of the brightness enhancing film may cause the mandrel size to failure to increase to some extent, preferred aged brightness enhancing films having prisms prepared from the polymerizable resin compositions described herein do not fail with a 6 mm mandrel.

When a (e.g. brightness enhancing) microstructure film is prepared using a process as described in previously cited Lu and Lu et al., the microstructures are disposed on a preformed base.

In the cylindrical mandrel bend test ISO 1519:2002(E) bend test, the strain at the prism surface (i.e. $\epsilon_{surface}$) is dependent on the radius of bend and the distance to the neutral axis, which is dependent on the thickness of the film and the geometry of the layers comprising the film. Typically, the stain at the surface of the film during the bend test can be approximated using the following equation:

$$\epsilon_{surface} = (T/2)/[(T/2)+(D/2)]$$

wherein T is the total thickness of the preformed base film and D is the bend test mandrel diameter. The following table depicts the calculated strain with various preformed based thicknesses and various bend test mandrel diameters.

| D (mm) | Film Thickness w/ Prisms (microns) | | | |
|---|---|---|---|---|
| | 150 | 200 | 275 | 525 |
| 2 | 0.070 | 0.091 | 0.121 | 0.208 |
| 3 | 0.048 | 0.063 | 0.084 | 0.149 |
| 4 | 0.036 | 0.048 | 0.064 | 0.116 |
| 5 | 0.029 | 0.038 | 0.052 | 0.095 |
| 6 | 0.024 | 0.032 | 0.044 | 0.080 |
| 8 | 0.018 | 0.024 | 0.033 | 0.062 |
| 10 | 0.015 | 0.020 | 0.027 | 0.050 |
| 12 | 0.012 | 0.016 | 0.022 | 0.042 |
| 16 | 0.009 | 0.012 | 0.017 | 0.032 |
| 20 | 0.007 | 0.010 | 0.014 | 0.026 |
| 25 | 0.006 | 0.008 | 0.011 | 0.021 |
| 32 | 0.005 | 0.006 | 0.009 | 0.016 |

Using this approximation, it can be calculated that the film fails the bend test when the strain at the film surface is greater than or equal to 0.025. This approximation can be used to determine the equivalent failing mandrel for microstructured films having a preformed base film of different thicknesses by solving the equation for D when $\epsilon_{surface}$ equals 0.025. Hence, D=1000(T/0.025−T)

Using this equation, it can be calculated that passing the 6 mm mandrel on the bend test of a 150 micron thick film is approximately equivalent to passing the 8 mm mandrel for a 200 micron thick film, which is approximately equivalent to passing the 12 mm mandrel for a 275 micron thick film and passing the 25 mm mandrel for a 525 micron thick film.

The organic component as well as the polymerizable composition is preferably substantially solvent free. "Substantially solvent free" refer to the polymerizable composition having less than 5 wt-%, 4 wt-%, 3 wt-%, 2 wt-%, 1 wt-% and 0.5 wt-% of (e.g. organic) solvent. The concentration of solvent can be determined by known methods, such as gas chromatography. Solvent concentrations of less than 0.5 wt-% are preferred.

The components of the organic component are preferably chosen such that the organic component has a low viscosity. Typically the viscosity of the organic component is substantially lower than the organic component of compositions previously employed. The viscosity of the organic component is less than 1000 cps and typically less than 900 cps. The viscosity of the organic component may be less than 800 cps, less than 700 cps, less than 600 cps, or less than 500 cps at the coating temperature. As used herein, viscosity is measured (at a shear rate up to 1000 sec-1) with 25 mm parallel plates using a Dynamic Stress Rheometer. Further, the viscosity of the organic component is typically at least 10 cps, more typically at least 50 cps, even more typically at least 100 cps, and most typically at least 200 cps at the coating temperature.

The coating temperature typically ranges from ambient temperature, (i.e. 25° C.) to 180° F. (82° C.). The coating temperature may be less than 170° F. (77° C.), less than 160° F. (71° C.), less than 150° F. (66° C.), less than 140° F. (60° C.), less than 130° F. (54° C.), or less than 120° F. (49° C.). The organic component can be a solid or comprise a solid component provided that the melting point in the polymerizable composition is less than the coating temperature. The organic component can be a liquid at ambient temperature.

The organic component as well as the polymerizable composition has refractive index of at least 1.47, for most product applications; whereas the polymerizable resin composition of a turning film may have a refractive index as low as 1.44. The refractive index of the organic component or the polymerizable composition may be at least 1.48, 1.49, 1.50, 1.51, 1.52, 1.53, 1.54, 1.55, 1.56, 1.57, 1.58, 1.59, or 1.60. The polymerizable composition including the nanoparticles can have a refractive index as high as 1.70. (e.g. at least 1.61, 1.62, 1.63, 1.64, 1.65, 1.66, 1.67, 1.68, or 1.69) High transmittance in the visible light spectrum is also typically preferred.

The polymerizable composition is energy curable in time scales preferably less than five minutes (e.g. for a brightness enhancing film having a 75 micron thickness). The polymerizable composition is preferably sufficiently crosslinked to provide a glass transition temperature that is typically greater than 45° C. The glass transition temperature can be measured by methods known in the art, such as Differential Scanning calorimetry (DSC), modulated DSC, or Dynamic Mechanical Analysis. The polymerizable composition can be polymerized by conventional free radical polymerization methods.

The polymerizable resin typically comprises a mixture of ethylenically unsaturated monomers. The mixtures typically includes at least one difunctional aromatic (meth)acrylate monomer and a major amount of a (e.g. aromatic) monofunctional (meth)acrylate monomer having a molecular weight less than 450 g/mole and having a refractive index of at least 1.50, 1.51, 1.52, 1.53, 1.54, 1.55, 1.56, 1.57 or 1.58.

In some embodiments, the organic component preferably comprises one or more (e.g. monofunctional) biphenyl monomer(s) in combination with at least one aromatic (meth)acrylate monomer having two or more (meth)acrylate groups.

Monofunctional biphenyl monomers comprise a terminal biphenyl group (wherein the two phenyl groups are not fused, but joined by a bond) or a terminal group comprising two aromatic groups joined by a linking group (e.g. Q). For example, when the linking group is methane, the terminal group is a biphenylmethane group. Alternatively, wherein the linking group is —(C(CH$_3$)$_2$—, the terminal group is 4-cumyl phenyl. The monofunctional biphenyl monomer(s) also comprise a single ethylenically unsaturated group that is preferably polymerizable by exposure to (e.g. UV) radiation. The monofunctional biphenyl monomer(s) preferably comprise a single (meth)acrylate group or single thio(meth)acrylate group. Acrylate functionality is typically preferred. In some aspects, the biphenyl group is joined directly to the ethylenically unsaturated (e.g. (meth)acrylate) group. An exemplary monomer of this type is 2-phenyl-phenyl acrylate. The biphenyl mono(meth)acrylate or biphenyl thio(meth)acrylate monomer may further comprise a (e.g. 1 to 5 carbon) alkyl group optionally substituted with one or more hydroxyl groups. An exemplary species of this type is 2-phenyl-2-phenoxyethyl acrylate.

The organic component may include a single biphenyl (meth)acrylate monomer or a combination of two or more biphenyl (meth)acrylate monomers. The total amount of such biphenyl monomers is generally at least 10 wt-%, 15 wt-%, 20 wt-% or 25 wt-% of the organic component. The total amount of monofunctional biphenyl monomers is no greater than 90 wt-%, and more typically no greater than about 75 wt-% (e.g. less than 70 wt-%, 65 wt-%, 60 wt-%). In some embodiments, the total amount of biphenyl monomer(s) ranges from 30 wt-% to 50 wt-% of the organic component.

In one embodiment, a monofunctional biphenyl (meth) acrylate monomer is employed having the general formula:

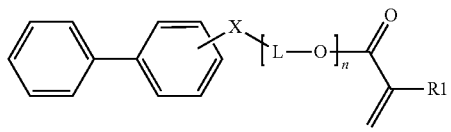

wherein

R1 is H or CH$_3$;

X is O or S;

n ranges from 0 to 10 (e.g. n is 1, 2, 3, 4, 5, 6, 7, 8, 9, or 10); and

L is an alkyl group having 1 to 5 carbon atoms (i.e. methyl, ethyl, propyl, butyl, or pentyl), optionally substituted with hydroxy.

In another embodiment, the monofunctional biphenyl (meth)acrylate monomer has the general formula:

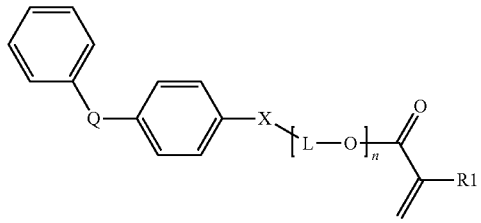

wherein

R1 is H or CH$_3$;

X is O or S;

Q is selected from —C(CH$_3$)$_2$—, —CH$_2$, —C(O)—, —S(O)—, and —S(O)$_2$—;

n ranges from 0 to 10 (e.g. n is 1, 2, 3, 4, 5, 6, 7, 8, 9, or 10); and

L is an alkyl group having 1 to 5 carbon atoms (i.e. methyl, ethyl, butyl, or pentyl), optionally substituted with hydroxy.

Some specific monomers that are commercially available from Toagosei Co. Ltd. of Japan, include for example 2-phenyl-phenyl acrylate available under the trade designation "TO-2344", 4-(-2-phenyl-2-propyl)phenyl acrylate available under the trade designation "TO-2345", and 2-phenyl-2-phenoxyethyl acrylate, available under the trade designation "TO-1463".

The inclusion of monofunctional biphenyl (e.g. (meth) acrylate) monomers can concurrently raise the refractive index of the organic component and improve the processability of the polymerizable composition by reducing the viscosity. These monomers are particularly advantageous when relatively high (i.e. greater than 25 wt-%) concentrations of (e.g. lower refractive index) difunctional (meth)acrylate monomers or oligomers are employed.

The organic component preferably comprises at least 5 wt-% and typically no greater than about 80 wt-% of a difunctional (meth)acrylate monomer or oligomer.

Suitable urethane (meth)acrylates are commercially available from Sartomer under the trade designations "CN965", "CN968", "CN981", "CN 983", "CN 984", "CN972", and "CN978"; from Cognis under the trade designation "Photomer 6210", "Photomer 6217", "Photomer 6230", "Photomer 6623", "Photomer 6891", and "Photomer 6892"; and from UCB under the trade designations "Ebecryl 1290", "Ebecryl 2001", and "Ebecryl 4842".

Suitable polyester (meth)acrylates are commercially available from Sartomer under the trade designation "CN292"; from Cognis under the trade designation "Photomer 5010", "Photomer 5429", "Photomer 5430", "Photomer 5432", "Photomer 5662", "Photomer 5806", and "Photomer 5920"; and from UCB under the trade designations "Ebecryl 80", "Ebecryl 81", "Ebecryl 83", "Ebecryl 450", "Ebecryl 524", "Ebecryl 525", "Ebecryl 585", "Ebecryl 588", "Ebecryl 810", and "Ebecryl 2047".

Suitable (meth)acrylated acrylic oligomers are also commercially available or can be prepared by methods know in the art.

The polymerizable composition may comprise an aromatic difunctional (meth)acrylate monomer that comprises a major portion having the following general structure:

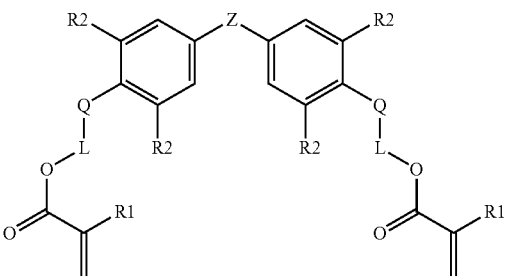

wherein each R1 is independently hydrogen or methyl. Each R2 is independently hydrogen or bromine Each Z is independently —C(CH$_3$)$_2$—, —CH$_2$—, —C(O)—, —S—, —S(O)—, or —S(O)$_2$—, and each Q is independently O or S. In some embodiments Z is preferably —C(CH$_3$)$_2$— and Q is preferably O. Typically, the R1 groups are the same. Typically, the R2 groups are the same as each other well. L is a linking group. L may independently comprise a branched or linear C$_2$-C$_{12}$ alkyl group (i.e. C$_2$, C$_3$, C$_4$, C$_5$, C$_6$, C$_7$, C$_8$, C$_9$, C$_{10}$, C$_{11}$, or C$_{12}$). The carbon chain of the alkyl group may optionally be substituted with one or more oxygen groups. Further, the carbon atoms of the alkyl group may optionally be substituted with one or more hydroxyl groups. For example L may be —CH$_2$CH(OH)CH$_2$—. Typically, the linking groups are the same. In one embodiment, the alkyl group is C$_{10}$. In another embodiment, the alkyl group comprises no more than 8 carbon atoms no more than 6 carbon atoms, or no more than 4 carbon atoms.

The di(meth)acrylate monomer may be synthesized or purchased. As used herein, major portion refers to at least 60-70 wt-% of the monomer containing the specific structure(s) just described. It is commonly appreciated that other reaction products are also typically present as a byproduct of the synthesis of such monomers.

The di(meth)acrylate monomer can be the reaction product of Tetrabromobisphenol A diglycidyl ether and acrylic acid. The first monomer may be obtained from UCB Corporation, Smyrna, Ga. under the trade designation "RDX-51027". This material comprises a major portion of 2-propenoic acid, (1-methylethylidene)bis[(2,6-dibromo-4,1-phenylene)oxy (2-hydroxy-3,1-propanediyl)]ester.

Various (meth)acrylated aromatic epoxy oligomers are commercially available. For example, (meth)acrylated aromatic epoxy, (described as a modified epoxy acrylates), are available from Sartomer, Exton, Pa. under the trade designation "CN118", "CN115" and "CN112C60". (Meth)acrylated aromatic epoxy oligomer, (described as an epoxy acrylate oligomer), is available from Sartomer under the trade designation "CN2204". Further, an (meth)acrylated aromatic epoxy oligomer, (described as an epoxy novolak acrylate blended with 40% trimethylolpropane triacrylate), is available from Sartomer under the trade designation "CN112C60".

In some embodiments, the aromatic epoxy acrylate is derived from bisphenol A, such as those of the structure previously described. In other embodiments, the aromatic epoxy acrylates is derived from a different monomer than bisphenol A.

One exemplary bisphenol-A ethoxylated diacrylate monomer is commercially available from Sartomer under the trade designations "SR602" (reported to have a viscosity of 610 cps at 20° C. and a Tg of 2° C.). Another exemplary bisphenol-A ethoxylated diacrylate monomer is as commercially available from Sartomer under the trade designation "SR601" (reported to have a viscosity of 1080 cps at 20° C. and a Tg of 60° C.).

The organic component optionally comprises up to about 50 wt-% (e.g. any amount ranging from 0 to 50) reactive diluents (i.e. other than the monofunctional biphenyl monomer(s). Reactive diluents are mono-ethylenically unsaturated monomers such as (meth)acrylates or monomeric N-substituted or N,N-disubstituted (meth)acrylamides, especially an acrylamide. These include N-alkylacrylamides and N,N-dialkylacrylamides, especially those containing $C_{1-4}$ alkyl groups. Examples are N-isopropylacrylamide, N-t-butylacrylamide, N,N-dimethylacrylamide, N,N-diethylacrylamide, N-vinyl pyrrolidone and N-vinyl caprolactam.

Diluents can have a refractive index greater than 1.50 (e.g. greater than 1.55). Such reactive diluents can be halogenated or non-halogenated (e.g. non-brominated). One exemplary high index optional monomer is 2,4,6-tribromophenoxyethyl (meth)acrylate commercially available from Daiichi Kogyo Seiyaku Co. Ltd (Kyoto, Japan) under the trade designation "BR-31".

Suitable reactive diluents include for example phenoxy ethyl (meth)acrylate; phenoxy-2-methylethyl (meth)acrylate; phenoxyethoxyethyl (meth)acrylate, 3-hydroxy-2-hydroxypropyl (meth)acrylate; benzyl (meth)acrylate; phenylthio ethyl acrylate; 2-naphthylthio ethyl acrylate; 1-naphthylthio ethyl acrylate; 2,4,6-tribromophenoxy ethyl acrylate; 2,4-dibromophenoxy ethyl acrylate; 2-bromophenoxy ethyl acrylate; 1-naphthyloxy ethyl acrylate; 2-naphthyloxy ethyl acrylate; phenoxy 2-methylethyl acrylate; phenoxyethoxyethyl acrylate; 3-phenoxy-2-hydroxy propyl acrylate; 2,4-dibromo-6-sec-butylphenyl acrylate; 2,4-dibromo-6-isopropylphenyl acrylate; benzyl acrylate; phenyl acrylate; 2,4,6-tribromophenyl acrylate. Other high refractive index monomers such as pentabromobenzyl acrylate and pentabromophenyl acrylate can also be employed.

The biphenyl (meth)acrylate monomer(s) are typically employed in combination with monofunctional reactive diluents having a lower refractive index than the biphenyl monomer(s).

A preferred diluent is phenoxyethyl (meth)acrylate, and in particular phenoxyethyl acrylate (PEA). Phenoxyethyl acrylate is commercially available from more than one source including from Sartomer under the trade designation "SR339"; from Eternal Chemical Co. Ltd. under the trade designation "Etermer 210"; and from Toagosei Co. Ltd under the trade designation "TO-1166". Benzyl acrylate is commercially available from AlfaAeser Corp, Ward Hill, Mass.

The organic component may optionally comprise a crosslinker that comprises at least three (meth)acrylate groups. In some embodiments, crosslinker may be present in the polymerizable composition in an amount of at least about 2 wt-%. Typically, the amount of crosslinking agent is not greater than about 25 wt-%. The crosslinking agent may be present in any amount ranging from about 5 wt-% and about 15 wt-%.

In some embodiments, the organic component comprises less than 5 wt-% crosslinker or is substantially free of crosslinker.

In some embodiments, it is preferred that the polymerizable resin composition is substantially free (i.e. contain less than 1 wt-%) of bromine In other embodiments, the total amount of bromine in combination with chlorine is less than 1 wt-%. In some aspects, the polymerizable resin composition is substantially non-halogenated (i.e. contains less than 1 wt-% total of bromine, chlorine, fluorine and iodine).

The UV curable polymerizable compositions comprise at least one photoinitiator. A single photoinitiator or blends thereof may be employed in the brightness enhancement film of the invention. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoybiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

The photoinitiator can be used at a concentration of about 0.1 to about 10 weight percent. More preferably, the photoinitiator is used at a concentration of about 0.5 to about 5 wt-%. Greater than 5 wt-% is generally disadvantageous in view of the tendency to cause yellow discoloration of the brightness enhancing film. Other photoinitiators and photoinitiator may also suitably be employed as may be determined by one of ordinary skill in the art.

Surfactants such as fluorosurfactants and silicone based surfactants can optionally be included in the polymerizable composition to reduce surface tension, improve wetting, allow smoother coating and fewer defects of the coating, etc.

Surface modified (e.g. colloidal) nanoparticles are present in the polymerized structure in an amount effective to enhance the durability and/or refractive index of the article or optical element. The total amount of surface modified inorganic nanoparticles can be present in the polymerizable resin or optical article in an amount of at least 10 wt-%, 20 wt-%, 30 wt-% or 40 wt-%. The concentration is typically less than to 70 wt-%, and more typically less than 60 wt-% in order that the polymerizable resin composition has a suitable viscosity for use in cast and cure processes of making microstructured films.

The size of such particles is chosen to avoid significant visible light scattering. It may be desirable to employ a mixture of inorganic oxide particle types to optimize an optical or material property and to lower total composition cost. The surface modified colloidal nanoparticles can be oxide particles having a (e.g. unassociated) primary particle size or associated particle size of greater than 1 nm, 5 nm or 10 nm. The primary or associated particle size is generally and less than 100 nm, 75 nm, or 50 nm. Typically the primary or associated particle size is less than 40 nm, 30 nm, or 20 nm. It is preferred that the nanoparticles are unassociated. Their measurements can be based on transmission electron microscopy (TEM). The nanoparticles can include metal oxides such as, for example, alumina, zirconia, titania, mixtures thereof, or mixed oxides thereof. Surface modified colloidal nanoparticles can be substantially fully condensed.

Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

Zirconia and titania nanoparticles can have a particle size from 5 to 50 nm, or 5 to 15 nm, or 8 nm to 12 nm. Zirconia nanoparticles can be present in the durable article or optical element in an amount from 10 to 70 wt-%, or 30 to 60 wt-%. Zirconias for use in composition and articles of the invention are available from Nalco Chemical Co. under the trade designation "Nalco OOSSOO8" and from Buhler AG Uzwil, Switzerland under the trade designation "Buhler zirconia Z-WO sol".

The zirconia particles can be prepared using hydrothermal technology as described in Published U.S. Patent Application No. 2006/0148950. More specifically, a first feedstock that contains a zirconium salt is subjected to a first hydrothermal treatment to form a zirconium-containing intermediate and a byproduct. A second feedstock is prepared by removing at least a portion of the byproduct formed during the first hydrothermal treatment. The second feedstock is then subjected to a second hydrothermal treatment to form a zirconia sol that contains the zirconia particles.

The first feedstock is prepared by forming an aqueous precursor solution that contains a zirconium salt. The anion of the zirconium salt is usually chosen so that it can be removed during subsequent steps in the process for preparing the zirconia sol. Additionally, the anion is often chosen to be non-corrosive, allowing greater flexibility in the type of material chosen for the processing equipment such as the hydrothermal reactors.

In one method of at least partially removing the anions in the precursor solution, the precursor solution can be heated to vaporize an acidic form of the anion. For example, a carboxylate anion having no more than four carbon atoms can be removed as the corresponding carboxylic acid. More specifically, an acetate anion can be removed as acetic acid. Although the free acetic acid can be removed, at least a portion of the acetic acid is typically adsorbed on the (e.g. zirconia) nanoparticle surface. Thus, the nanoparticles typically comprise adsorbed volatile acid.

"Volatile acid" refers to monocarboxylic acids having six or less carbon atoms, such as acrylic acid, methacrylic acid, acetic acid, and mixtures thereof. Of these, acetic acid is non-reactive with the organic component; whereas acrylic acid and methacrylic acid are reactive volatile resins since the (meth)acrylate groups of these acids can copolymerize with the (meth)acrylate groups of the monomers of the organic components.

Surface modification involves attaching surface modification agents to inorganic oxide (e.g. zirconia) particles to modify the surface characteristics. The overall objective of the surface modification of the inorganic particles is to provide resins with homogeneous components and preferably a low viscosity that can be prepared into films (e.g. using cast and cure processes) with high brightness.

The nanoparticles are often surface-modified to improve compatibility with the organic matrix material. The surface-modified nanoparticles are often non-associated, non-agglomerated, or a combination thereof in an organic matrix material. The resulting light management films that contain these surface-modified nanoparticles tend to have high optical clarity and low haze. The addition of the high refractive index surface-modified nanoparticles, such as zirconia, can increase the gain of brightness enhancement film compared to films that contain only polymerized organic material.

It is surmised that the non-reactive volatile acid (e.g. acetic acid) adsorbed on the surface of the nanoparticles is displaced by these various (e.g. non-volatile) carboxylic acid(s). In addition to the use of surface treatments, the (e.g. brightness enhancing film) may also be subjected to addition processes steps (e.g. heat treatment) to reduce the non-reactive volatile acid content. Although, a detectable amount may be present (0.01 wt-% to 0.1 wt-%), the non-reactive volatile acid content of the brightness enhancing film is generally less than 5 wt-%. The total amount of non-volatile acid in combination with reactive volatile acid content (e.g. those acids having groups that are polymerizable with the organic components) may be substantially higher, ranging up to about 20 wt-%. For example, the non-volatile acid content of the surface modified particles, polymerized resin, or polymerized structure may total 1 wt-%, 2 wt-%, 3 wt-%, 4 wt-%, 5 wt-%, 6 wt-%, 7 wt-%, 8 wt-%, 9 wt-%, 10 wt-%, 11 wt-%, 12 wt-%, 13 wt-%, 14 wt-%, 15 wt-%, 16 wt-%, 17 wt-%, 18 wt-%, 19 wt-%, or 20 wt-%. Likewise, the reactive volatile acid content of the surface modified particles, polymerized resin, or polymerized structure may total 1 wt-%, 2 wt-%, 3 wt-%, 4 wt-%, 5 wt-%, 6 wt-%, 7 wt-%, 8 wt-%, 9 wt-%, 10 wt-%, 11 wt-%, 12 wt-%, 13 wt-%, 14 wt-%, 15 wt-%, 16 wt-%, 17 wt-%, 18 wt-%, 19 wt-%, or 20 wt-%.

The monocarboxylic acid surface treatments preferably comprise a compatibilizing group. The monocarboxylic acids may be represented by the formula A-B where the A group is a (e.g. monocarboxylic acid) group capable of attaching to the surface of a (e.g. zirconia or titania) nanoparticle, and B is a compatibilizing group that comprises a variety of different functionalities. The carboxylic acid group can be attached to the surface by adsorption and/or formation of an ionic bond. The compatibilizing group B is generally chosen such that it is compatible with the polymerizable resin of the (e.g. brightness enhancing) optical article. The compatibilizing group B can be reactive or nonreactive and can be polar or non-polar.

Compatibilizing groups B that can impart non-polar character to the zirconia particles include, for example, linear or branched aromatic or aliphatic hydrocarbons. Representative examples of non-polar modifying agents having carboxylic acid functionality include octanoic acid, dodecanoic acid, stearic acid, oleic acid, and combinations thereof.

The compatibilizing group B may optionally be reactive such that it can copolymerize with the organic matrix of the (e.g. brightness enhancing) optical article. For instance, free radically polymerizable groups such as (meth)acrylate compatibilizing groups can copolymerize with (meth)acrylate functional organic monomers to generate brightness enhancement articles with good homogeneity.

The (e.g. zirconia) inorganic nanoparticles described herein are preferably surface modified with two different surface treatments.

In some embodiments, the inorganic nanoparticles comprise a first surface treatment comprising at least one monocarboxylic acid having a non-reactive compatibilizing group. By "non-reactive" it is meant that the compatibilizing group does not react with the organic component. The second surface treatment comprises at least one monocarboxylic acid having a copolymerizable group that reacts with the organic component. The combination of surface treatments are employed in amounts such that the nanoparticles comprise a major amount of the surface treatment that reacts with the organic components. Accordingly, the stoichiometric amount of the second surface treatment is greater than the first surface treatment.

For example the ratio of ii) to i) may be 1.1:1 or 1.5:1 or 2:1 or 3:1 or 4:1 or 5:1.

The first surface treatment comprises at least one monocarboxylic acid (i.e., containing one carboxylic acid group per molecule) having a non-reactive compatibilizing group. Such compatibilizing group typically comprises a polar-group such as a (e.g. polyether group) water soluble tail. Such surface treatment can impart polar character to the zirconia or titania particles.

The polyether tail comprises repeating difunctional alkoxy radicals having the general formula —O—R—. Preferred R groups have the general formula —$C_nH_{2n}$— and include, for example, methylene, ethylene and propylene (including n-propylene and i-propylene) or a combination thereof. Combinations of R groups may be provided, for example, as random, or block type copolymers.

A preferred class of monocarboxylic acids having a polyether tail may be represented generally by the following formula:

$$CH_3—[O—(CH_2)_y]_x—X—COOH$$

wherein
X is a divalent organic linking group;
x ranges from about 1-10; and
y ranges from about 1-4.
Representative examples of X include —$X_2$—$(CH_2)_n$— where $X_2$ is —O— —S—, —C(O)O—, —C(O)NH— and wherein n ranges from about 1-3.

Examples of preferred polyether carboxylic acids include 2-[2-(2-methoxyethoxy)ethoxy]acetic acid having the chemical structure $CH_3O(CH_2CH_2O)_2CH_2COOH$ (hereafter MEEAA) and 2-(2-methoxyethoxy)acetic acid having the chemical structure $CH_3OCH_2CH_2OCH_2COOH$ (hereafter MEAA). MEAA and MEEAA are commercially from Aldrich Chemical Co., Milwaukee, Wis. as catalog numbers 40, 701-1 and 40, 700-3, respectively.

Other surface modifiers with polyether compatibilizing tails include those generally prepared by the reaction of an aliphatic anhydride and a polyalkylene oxide monoether. Surface modifiers of this type include succinic acid mono-[2-(2-methoxy-ethoxy)-ethyl]ester, maleic acid mono-[2-(2-methoxy-ethoxy)-ethyl]ester, and glutaric acid mono-[2-(2-methoxy-ethoxy)-ethyl]ester. These molecules are shown as follows:

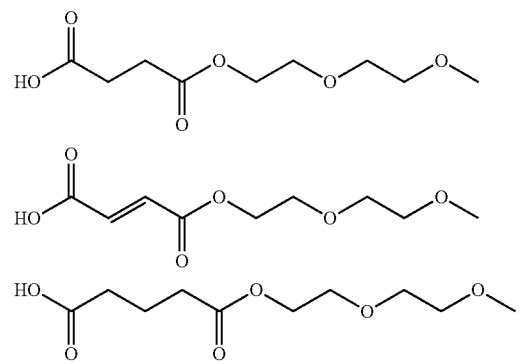

Mixture of two or more polyether carboxylic acids can also be employed.

In other aspects, compatibilizers with a relatively high refractive index (e.g. R1 is at least 1.50) can be advantageous in the preparation of optical articles such as brightness enhancement films. Compatibilizers containing one or more aromatic groups, such as phthalate groups, advantageously have a high refractive index and thus the inclusion of such can raise the refractive index of the overall polymerizable composition. Other methods of raising the refractive index include the inclusion of sulfur or bromine atoms into the surface modifier molecules.

Various phthalate based material can be produced by the reaction schemes as follows.

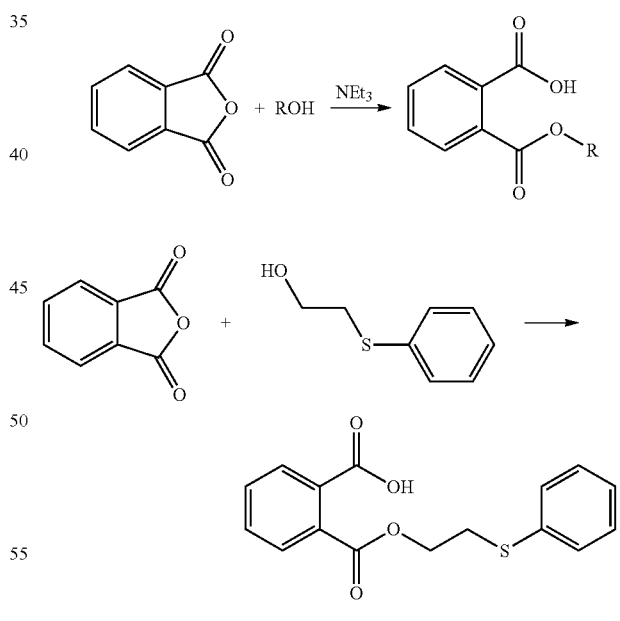

Phthalic acid mono-(2-phenylsulfanyl-ethyl) ester

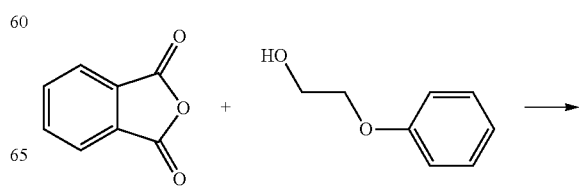

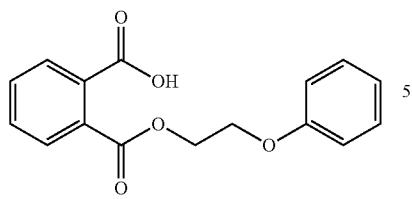

Phthalic acid mono-(2-phenoxy-ethyl) ester

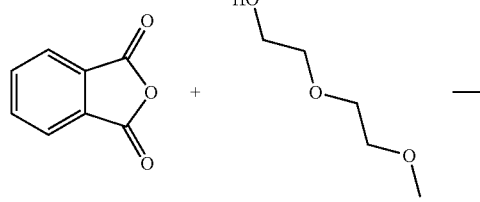

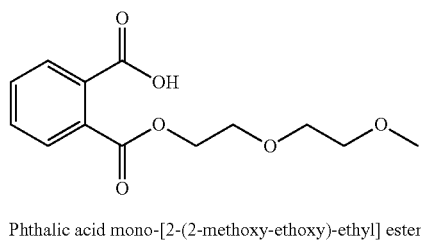

Phthalic acid mono-[2-(2-methoxy-ethoxy)-ethyl] ester

The second surface treatment comprises at least one (e.g. non-volatile) monocarboxylic acid having a reactive group that can copolymerize with organic component. In one embodiment, the second surface treatment is preferably a (meth)acrylate functionalized surface treatment prepared by the reaction of an aliphatic or aromatic anhydride and a hydroxyl alkyl (meth)acrylate.

Examples of surface modification agents of this type are succinic acid mono-(2-acryloyloxy-ethyl)ester, maleic acid mono-(2-acryloyloxy-ethyl)ester, and glutaric acid mono-(2-acryloyloxy-ethyl)ester, maleic acid mono-(4-acryloyloxy-butyl)ester, succinic acid mono-(4-acryloyloxy-butyl)ester, glutaric acid mono-(4-acryloyloxy-butyl)ester. These species are shown as follows:

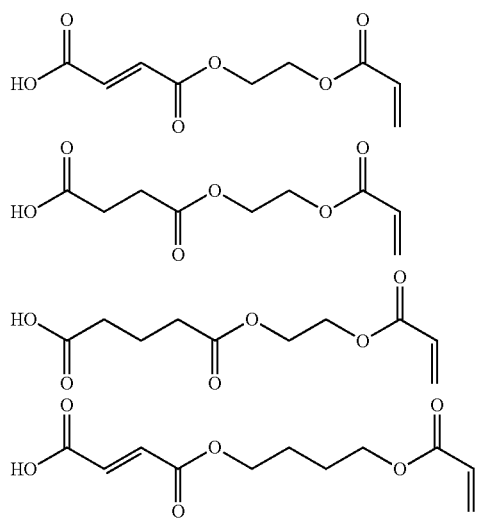

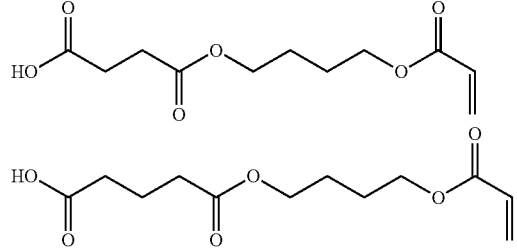

Other aliphatic surface modifiers of this type could include mono(meth)acryloxypolyethyleneglycol succinate, or the analogous materials made from maleic or glutaric anhydride.

Other surface modifier of this type, can be prepared from aromatic anhydrides. Examples of such molecules are phthalic acid mono-(2-acryloyloxy-ethyl)ester and phthalic acid mono-(2-acryloyloxy-butyl)ester, which can be prepared starting with phthalic anhydride. They can be produced by the reaction scheme as follows:

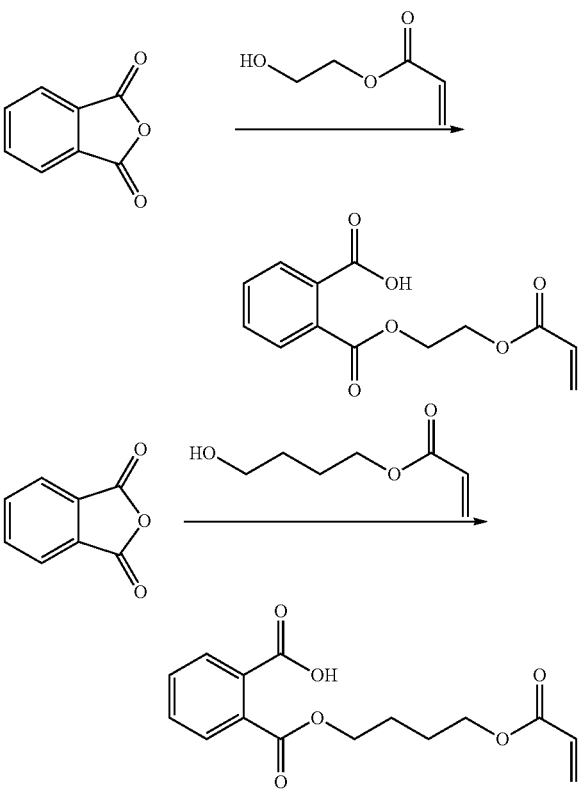

Another reactive surface modifier is beta-carboxylethyl acrylate.

In addition to the first and second surface treatment, the surface treatment may additionally comprise a mono or dicarboxylic acid. Representative examples include acrylic acid methacrylic acid, as well as various dicarboxylic acids. The dicarboxylic acids are preferably relatively low in molecular weight. The dicarboxylic acid may be linear or branched. Dicarboxylic acids having up to 6 carbon atoms between the carboxylic acids groups are preferred. These include for example maleic acid, succinic acid, suberic acid, phthalic acid, and itaconic acid.

The surface modification of the particles in the colloidal dispersion can be accomplished in a variety of ways. The process generally involves the mixture of an inorganic particle dispersion with surface modifying agents. Optionally, a co-solvent can be added at this point, such as for example, 1-methoxy-2-propanol, ethanol, isopropanol, ethylene glycol, N,N-dimethylacetamide and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing.

The surface modified particles can then be incorporated into the curable (i.e. polymerizable) resin compositions in various methods. In a preferred aspect, a solvent exchange procedure is utilized whereby the resin is added to the surface modified sol, followed by removal of the water and co-solvent (if used) via evaporation, thus leaving the particles dispersed in the polymerizable resin. The evaporation step can be accomplished for example, via distillation, rotary evaporation or oven drying. In another aspect, the surface modified particles can be extracted into a water immiscible solvent followed by solvent exchange, if so desired. Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

The optical layer can directly contact the base layer or be optically aligned to the base layer, and can be of a size, shape and thickness allowing the optical layer to direct or concentrate the flow of light. The optical layer can have a structured or micro-structured surface that can have any of a number of useful patterns such as described and shown in U.S. Pat. No. 7,074,463. The micro-structured surface can be a plurality of parallel longitudinal ridges extending along a length or width of the film. These ridges can be formed from a plurality of prism apexes. These apexes can be sharp, rounded or flattened or truncated. For example, the ridges can be rounded to a radius in a range of 4 to 7 to 15 micrometers.

These include regular or irregular prismatic patterns can be an annular prismatic pattern, a cube-corner pattern or any other lenticular microstructure. A useful microstructure is a regular prismatic pattern that can act as a totally internal reflecting film for use as a brightness enhancement film. Another useful microstructure is a corner-cube prismatic pattern that can act as a retro-reflecting film or element for use as reflecting film. Another useful microstructure is a prismatic pattern that can act as an optical element for use in an optical display. Another useful microstructure is a prismatic pattern that can act as an optical turning film or element for use in an optical display.

The base layer can be of a nature and composition suitable for use in an optical product, i.e. a product designed to control the flow of light. Almost any material can be used as a base material as long as the material is sufficiently optically clear and is structurally strong enough to be assembled into or used within a particular optical product. A base material can be chosen that has sufficient resistance to temperature and aging that performance of the optical product is not compromised over time.

The particular chemical composition and thickness of the base material for any optical product can depend on the requirements of the particular optical product that is being constructed. That is, balancing the needs for strength, clarity, temperature resistance, surface energy, adherence to the optical layer, among others.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, polyimides, and glass. Optionally, the base material can contain mixtures or combinations of these materials. In an embodiment, the base may be multilayered or may contain a dispersed component suspended or dispersed in a continuous phase.

For some optical products such as microstructure-bearing products such as, for example, brightness enhancement films, examples of preferred base materials include polyethylene terephthalate (PET) and polycarbonate. Examples of useful PET films include photograde polyethylene terephthalate and MELINEX™ PET available from DuPont Films of Wilmington, Del.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120. The use of these polarizer films in combination with a brightness enhancement film has been described in U.S. Pat. No. 6,111,696.

A second example of a polarizing film that can be used as a base are those films described in U.S. Pat. No. 5,882,774. Films available commercially are the multilayer films sold under the trade designation DBEF (Dual Brightness Enhancement Film) from 3M. The use of such multilayer polarizing optical film in a brightness enhancement film has been described in U.S. Pat. No. 5,828,488.

For the following defined terms, these definitions shall be applied, unless a different definition is given in the claims or elsewhere in this specification.

"Microstructure" is used herein as defined and explained in U.S. Pat. No. 4,576,850. Thus, it means the configuration of a surface that depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about +/−0.005 to +/−750 microns, as measured by an optical or electron microscope, through a representative characteristic length of the surface, e.g., 1-30 cm. Said average center line can be plano, concave, convex, aspheric or combinations thereof. Articles where said deviations are of low order, e.g., from +/−0.005+/−0.1 or, preferably, +/−0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high-order, e.g., from +/−0.1 to +/−750 microns, and attributable to microstructure comprising a plurality of utilitarian discontinuities which are the same or different and spaced apart or contiguous in a random or ordered manner, are articles such as retroreflective prismatic sheeting, microstructured molds (e.g. for molding paste to prepare barrier ribs), linear Fresnel lenses, video discs, light-collimating privacy films, and brightness enhancing films. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles.

"Index of refraction," or "refractive index," refers to the absolute refractive index of a material (e.g., a monomer) that is understood to be the ratio of the speed of electromagnetic radiation in free space to the speed of the radiation in that material. The refractive index can be measured using known methods and is generally measured using a Bausch and Lomb Refractometer (CAT No. 33.46.10). It is generally appreciated that the measured index of refraction can vary to some extent depending on the instrument.

"(Meth)acrylate" refers to both acrylate and methacrylate compounds.

The term "nanoparticles" is defined herein to mean particles (primary particles or associated primary particles) with a diameter less than about 100 nm.

"Surface modified colloidal nanoparticle" refers to nanoparticles each with a modified surface such that the nanoparticles provide a stable dispersion.

"Stable dispersion" is defined herein as a dispersion in which the colloidal nanoparticles do not agglomerate after standing for a period of time, such as about 24 hours, under ambient conditions—e.g. room temperature (about 20-22° C.), atmospheric pressure, and no extreme electromagnetic forces.

"Aggregation" refers to a strong association between primary particles that may be chemically bound to one another. The breakdown of aggregates into smaller particles is difficult to achieve.

"Agglomeration refers to a weak association between primary particles which my be held together by charge or polarity and can be broken down into smaller entities.

"Primary particle size" refers to the mean diameter of a single (non-aggregate, non-agglomerate) particle.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about."

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

1. Gain Test Method

Optical performance of the films was measured using a SpectraScan™ PR-650 SpectraColorimeter with an MS-75 lens, available from Photo Research, Inc, Chatsworth, Calif. The films were placed on top of a diffusely transmissive hollow light box. The diffuse transmission and reflection of the light box can be described as Lambertian. The light box was a six-sided hollow cube measuring approximately 12.5 cm×12.5 cm×11.5 cm (L×W×H) made from diffuse PTFE plates of ~6 mm thickness. One face of the box is chosen as the sample surface. The hollow light box had a diffuse reflectance of ~0.83 measured at the sample surface (e.g. ~83%, averaged over the 400-700 nm wavelength range, measurement method described below). During the gain test, the box is illuminated from within through a ~1 cm circular hole in the bottom of the box (opposite the sample surface, with the light directed towards the sample surface from the inside). This illumination is provided using a stabilized broadband incandescent light source attached to a fiber-optic bundle used to direct the light (Fostec DCR-II with ~1 cm diameter fiber bundle extension from Schott-Fostec LLC, Marlborough Mass. and Auburn, N.Y.). A standard linear absorbing polarizer (such as Melles Griot 03 FPG 007) is placed between the sample box and the camera. The camera is focused on the sample surface of the light box at a distance of ~34 cm and the absorbing polarizer is placed ~2.5 cm from the camera lens. The luminance of the illuminated light box, measured with the polarizer in place and no sample films, was >150 cd/m$^2$. The sample luminance is measured with the PR-650 at normal incidence to the plane of the box sample surface when the sample films are placed parallel to the box sample surface, the sample films being in general contact with the box. The relative gain is calculated by comparing this sample luminance to the luminance measured in the same manner from the light box alone. The entire measurement was carried out in a black enclosure to eliminate stray light sources.

The diffuse reflectance of the light box was measured using a 15.25 cm (6 inch) diameter Spectralon-coated integrating sphere, a stabilized broadband halogen light source, and a power supply for the light source all supplied by Labsphere (Sutton, N.H.). The integrating sphere had three opening ports, one port for the input light (of 2.5 cm diameter), one at 90 degrees along a second axis as the detector port (of 2.5 cm diameter), and the third at 90 degrees along a third axis (i.e. orthogonal to the first two axes) as the sample port (of 5 cm diameter). A PR-650 Spectracolorimeter (same as above) was focused on the detector port at a distance of ~38 cm. The reflective efficiency of the integrating sphere was calculated using a calibrated reflectance standard from Labsphere having ~99% diffuse reflectance (SRT-99-050). The standard was calibrated by Labsphere and traceable to a NIST standard (SRS-99-020-REFL-51). The reflective efficiency of the integrating sphere was calculated as follows:

Sphere brightness ratio=1/(1-$R$sphere*$R$standard)

The sphere brightness ratio in this case is the ratio of the luminance measured at the detector port with the reference sample covering the sample port divided by the luminance measured at the detector port with no sample covering the sample port. Knowing this brightness ratio and the reflectance of the calibrated standard (Rstandard), the reflective efficiency of the integrating sphere, Rsphere, can be calculated. This value is then used again in a similar equation to measure a sample's reflectance, in this case the PTFE light box:

Sphere brightness ratio=1/(1-$R$sphere*$R$sample)

Here the sphere brightness ratio is measured as the ratio of the luminance at the detector with the sample at the sample port divided by the luminance measured without the sample. Since Rsphere is known from above, Rsample can be calculated. These reflectances were calculated at 4 nm wavelength intervals and reported as averages over the 400-700 nm wavelength range.

The single sheet gain is tested in the vertical (or perpendicular orientation relative to the front face of the diffuser boxed used in the E.T. Tester). In the horizontal, or crossed sheet configuration, the bottom sheet of the film stack is in the vertical orientation and the top sheet is horizontal or parallel to the front face of the diffuser box.

2. Tensile Properties

The polymerizable resin compositions were formed into suitable test specimens for tensile property testing by pouring the resin into a mold. The base of the mold that contacts the polymerizable resin consisted of a quartz glass plate having a thickness of 0.25 inches.

Disposed on the quartz glass plate is a rectangular shaped silicone layer (width=5 inches, length=9 inches, and thickness=~0.031 inches) having a rectangular opening in the middle (width=0.5", length=7 inches, and thickness=~0.031 inches). This silicone layer forms the side walls of the mold. One silicone mold material was found to be useful is available from McMaster-Carr with Cat. No. 86045K321.

The rectangular recess of the mold was filled with the polymerizable resin. The exposed surface of the resin and mold were then covered with 5 mil unprimed PET. The filled mold was then exposed to ultraviolet radiation from a "D-bulb" using a 600 W/in. variable power supply available from Fusion UV Systems, Inc. Gaithersburg, Md. at a line speed of 50 feet per minute for two passes per side for a total of 4 passes. The molded samples ranged in thickness from 0.038 to 0.043 inches.

The samples were first conditioned for 16 hours at 65° C. prior to tensile testing in a vented convection oven. The samples were then conditioned at 67-72° F. and 5-30 relative humidity for to testing.

The tensile properties of the cured films of polymerized resin were measured as described in ASTM D 882-02 Standard Test Method for Tensile Properties of Thin Plastic Sheeting. The crosshead speed (rate of grip separation) was equal to the initial grip separation (4 inches) multiplied by the initial strain rate (0.025 inches/inch minute). The thickness of the specimen was measured according to Section 10.2 of ASTM D 882-02.

3. Bend Test (cylindrical mandrel) as described in ISO 1519 was used to measure the crack resistance of the brightness enhancing films, reporting the mandrel size at failure.

The bend testing was conducted with the prisms axis perpendicular to the mandrel axis and the prisms facing away from the mandrel. The samples tested were conditioned for 16 hours at 65° C.

$ZrO_2$ Sols

The $ZrO_2$ sols used in the examples had the following properties (as measured according to the Photo Correlation Spectroscopy (PCS), X-Ray Diffraction and Thermal Gravimetric Analysis methods described in U.S. Patent Publication No. 2006/0204745 and Ser. No. 11/078,468):

| | PCS Data | | |
|---|---|---|---|
| Dispersion Index | Intensity avg size (nm) | Volume-avg size (nm) | (Intensity-avg)/(Volume-avg) |
| 1.0-2.4 | 23.0-37.0 | 8.0-18.8 | 1.84-2.97 |

| Relative Intensities | | Apparent Crystallite Size (nm) | | | | | Weighted |
|---|---|---|---|---|---|---|---|
| Cubic/ Tetragonal | Monoclinic | (C, T) (1 1 1) | M (−1 1 1) | M (1 1 1) | Avg M Size | % C/T | Avg XRD Size |
| 100 | 6-12 | 7.0-8.5 | 3.0-6.0 | 4.0-11.0 | 4.5-8.3 | 89%-94% | 7.0-8.4 |

% C/T = Primary particle size

The preparation of $ZrO_2$ sols is described in U.S. Patent Publication No. 2006/0204745 and application Ser. No. 11/078,468 filed Mar. 11, 2005.

Preparation of phthalic acid mono-(2-acryloyloxy-ethyl)ester

Mix 112.1 g. phthalic anhydride, 87.9 g 2-hydroxyethyl acrylate and 0.44 g. triethylamine in a round bottom flask. Bubble a small amount of dry air into the liquid. Mix and heat the reaction to 75° C. Hold the reaction at that temperature for six hours. Cool to room temperature. The product was analyzed and determined to be phthalic acid mono-(2-acryloyloxy-ethyl)ester by NMR. The product partially crystallizes over time.

Control

The $ZrO_2$ sol (103.17 g), MEEAA (6.08 g), water (77.00 g), 1-methoxy-2-propanol (150.0 g), a 20.76% solution of maleic acid in 1-methoxy-2-propanol (6.31 g), a 2/3/5 blend of TMPTA/PEA/BR31 (26.82 g), and a 5% solution of Prostab 5198 in water (0.20 g) were charged to a 1 L round bottom flask. Water and 1-methoxy-2-propanol were removed via rotary evaporation to obtain a concentrated $ZrO_2$ sol with a refractive index of 1.540. 1-methoxy-2-propanol (70.0 g) and water (50.0 g) were added to the $ZrO_2$ sol. Water and 1-Methoxy-2-propanol were removed via rotary evaporation to obtain a concentrated $ZrO_2$ sol with a refractive index of 1.554. Phthalic acid mono-(2-acryloyloxy-ethyl)ester (3.28 g), 1-methoxy-2-propanol (10.0 g) and water (6.0 g) were charged to the concentrated $ZrO_2$ sol. Water and alcohol were removed via rotary evaporation to obtain a dispersion of $ZrO_2$ in acrylic resin with a refractive index of 1.645. 1-methoxy-2-propanol (2.0 g) and water (0.2 g) were charged to the $ZrO_2$ dispersion. The remainder of the alcohol and water were removed via rotary evaporation. The resultant dispersion of $ZrO_2$ in acrylic resin was approximately 52.4% $ZrO_2$ and had a refractive index of 1.6495.

Polymerizable Resin Composition 1

$ZrO_2$ sol (1400 g at 40.87 wt. % solids), succinic acid mono-[2-(2-methoxy-ethoxy)-ethyl]ester (120.84 g @ 50 wt. % solids in 1-methoxy-2-propanol), 1-methoxy-2-propanol (966 g), succinic acid mono-(2-acryloyloxy-ethyl)ester (167.2 g @ 50 wt. % solids in 1-methoxy-2-propanol), a 50/25/25 blend of 2-phenyl-phenyl acrylate/SR601/PEA (357.3 g) and ProStab 5198 (0.22 g) were charged to a 3 neck 1 L RB flask. Water and alcohol were removed via vacuum distillation such that the resultant dispersion was approximately 53.3% $ZrO_2$ in acrylate resin. 0.467 wt % of Darocure 1173 was added to the stripped composite resin. The refractive index of the final blend was measured at 1.649 using a Bausch and Lomb Refractometer (CAT No. 33.46.10). The viscosity was reported at 346 cP at 60° C. using a Brookfield DV II+ Viscometer equipped with spindle 18 and a small sample adapter.

Polymerizable Resin Composition 2

$ZrO_2$ sol (40.86 wt % $ZrO_2$), 2-[2-(2-methoxyethoxy)ethoxy] acetic acid, succinic acid mono-(2-acryloyloxy-ethyl)ester, a 50/30/20 wt-% blend of 2-phenyl-phenyl acrylate/PEA/SR601, and ProStab 5198 were combined in a similar fashion as in Ex. 1b. To this blend, 26.8 wt. % of 1-methoxy-2-propanol was added. Water and alcohol were removed via vacuum distillation such that the resultant dispersion was approximately:

3.00 parts 2-[2-(2-methoxyethoxy)ethoxy]acetic acid
0.005 parts Prostab5198
10.94 parts succinic acid mono-(2-acryloyloxy-ethyl)ester
9.312 parts PEA
6.21 parts SR601
15.52 parts 2-phenyl-phenyl acrylate
55.00 parts $ZrO_2$ The refractive index of the final blend was measured at 1.6475 using a Bausch and Lomb Refractometer (CAT No. 33.46.10). The viscosity was reported at 340 cP at 60° C. using a Brookfield DV II+ Viscometer equipped with spindle 18 and a small sample adapter. 0.470 wt % of Darocure 1173 was added to the stripped composite resin.

Polymerizable Resin Composition 3

$ZrO_2$ sol (40.86 wt % $ZrO_2$), succinic acid mono-[2-(2-methoxy-ethoxy)-ethyl]ester, succinic acid mono-(2-acryloyloxy-ethyl)ester, a 50/30/20 wt-% blend of 2-phenyl-phenyl acrylate/PEA/SR601, and ProStab 5198 were combined in a similar fashion as in Polymerizable Resin Composition 1. To this blend, 13.9 wt. % of 1-methoxy-2-propanol was added. Water and alcohol were removed via vacuum distillation such that the resultant dispersion was approximately:

5.6 parts succinic acid mono-[2-(2-methoxy-ethoxy)-ethyl] ester
0.005 parts Prostab5198
8.3 parts succinic acid mono-(2-acryloyloxy-ethyl)ester
9.8 parts PEA
6.6 parts SR601
16.4 parts 2-phenyl-phenyl acrylate
53.3 parts $ZrO_2$ The refractive index of the final blend was measured at 1.6479 using a Bausch and Lomb Refractometer (CAT No. 33.46.10). The viscosity was reported at 315 cP at 60° C. using a AR 2000 rheometer available from TA Instruments (New Castle, Del.) equipped with 0° 40 mm parallel plates, a gap of 500 microns and a shear rate of 1000 $s^{-1}$. 0.470 wt % of Darocure 1173 was added to the stripped composite resin.

Film Preparation

An 8"×11" metal master consisting of linear rows of 90 degree prisms with a nominal pitch spacing of 50 microns, similar to the prism geometry pattern found on Vikuiti BEF II (commercially available from 3M Co., St. Paul, Minn.), was placed on a hot plate and heated to 140° F. A 4 ml bead of each of the polymerizable resin of Examples 1-3 were separately applied to the master tool using a disposable pipette. Next, a 500 gauge PET available from Dupont Teijin Films as MELINEX 623 was placed on the bead of resin and master tool.

The PET film was oriented so the linear prisms are oriented approximately perpendicular (90°+/−20°) to the high gain axis of the film. The master tool, resin and PET were then passed through a heated nip roll at 160° F. with sufficient force for the resin to fill the master tool completely, while eliminating any entrained air. The filled master tool was then exposed to ultraviolet radiation from a "D-bulb" using a 600 W/in. variable power supply available from Fusion UV Systems, Inc. Gaithersburg, Md. at a linespeed of 50 fpm for two passes. The PET film was then manually removed from the master tool. The prismatic coating formed on the PET film resulted in a coating thickness of approximately 25 microns.

| Resin | Single Sheet Gain | Crossed Sheet Gain |
|-------|-------------------|--------------------|
| Ex. 1 | 1.825 | 3.078 |
| Ex. 2 | 1.838 | 3.113 |
| Ex. 3 | 1.820 | |

The samples of brightness enhancing films subjected to the tensile, elongation, and bend testing were prepared using a continuous process analogous to the film preparation described above.

| Polymerizable Resin Composition | Tensile Strength at Break | Elongation at Break | Failing Mandrel Size for Bend Test of Brightness Enhancing Film |
|---|---|---|---|
| Control | 21.7 MPa | 0.875% | 8 mm |
| Example 1 | 62.5 MPa | 3.29% | passed 2 mm |
| Example 3 | 30.6 MPa | 8.14% | passed 2 mm |

Polymerizable Resin Composition 4

Another polymerizable resin suitable for the prism structures of a brightness enhancing film that is surmised to exhibit the target tensile, elongation, and mandrel size is as follows:

$ZrO_2$ sol (40.86 wt % $ZrO_2$), succinic acid mono-[2-(2-methoxy-ethoxy)-ethyl]ester, succinic acid mono-(2-acryloyloxy-ethyl)ester, a 50/30/20 wt-% blend of 2,4,6 tribromophenoxy ethyl acrylate/PEA/SR601, and ProStab 5198 could be combined in a similar fashion as in Polymerizable Resin Composition 1. To this blend, 13.9 wt. % of 1-methoxy-2-propanol could be added. Water and alcohol could be removed via vacuum distillation such that the resultant dispersion would be approximately:

5.6 parts succinic acid mono-[2-(2-methoxy-ethoxy)-ethyl]ester
0.005 parts Prostab5198
8.3 parts succinic acid mono-(2-acryloyloxy-ethyl)ester
9.8 parts PEA
6.6 parts SR601
16.4 parts 2,4,6 tribromophenoxy ethyl acrylate
53.3 parts $ZrO_2$
0.470 wt % of Darocure 1173 could be added to the stripped composite resin.

What is claimed is:

1. A brightness enhancing film having a polymerized structure comprising the reaction product of a polymerizable resin composition comprising
    an organic component comprising one or more ethylenically unsaturated monomer(s) or oligomer(s); and
    at least 10 wt. % of the polymerizable resin composition comprises inorganic nanoparticles surface modified with a first and second surface treatment
        the first surface treatment comprising at least one monocarboxylic acid having a non-reactive compatibilizing group, and
        the second surface treatment comprising at least one non-volatile monocarboxylic acid having a copolymerizable group that reacts with the organic component;
    wherein the nanoparticles comprise the second surface treatment in a stoichiometric amount greater than the first surface treatment.

2. The brightness enhancing film of claim 1 wherein the brightness enhancing film has a mandrel size to failure of less than 6 mm.

3. The brightness enhancing film of claim 1 wherein the polymerizable resin composition has a refractive index of at least 1.61.

4. The brightness enhancing film of claim 1 wherein the polymerizable resin composition has a refractive index of at least 1.645.

5. The brightness enhancing film of claim 1 wherein one of the ethylenically unsaturated monomers of the organic component is a biphenyl monomer having a (meth)acrylate group.

6. The brightness enhancing film of claim 1 wherein one of the ethylenically unsaturated monomers of the organic component is a difunctional aromatic (meth)acrylate monomer in an amount ranging from 5 wt. % to 80 wt. % of the organic component.

7. The brightness enhancing film of claim 1 wherein the polymerizable resin composition comprises less than 5 wt. % of a crosslinker having at least three ethylenically unsaturated groups.

8. The brightness enhancing film of claim 1 wherein the polymerizable resin composition is free of silane surface treatments.

9. The brightness enhancing film of claim 1 wherein the first surface treatment has the formula:

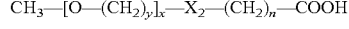

wherein $X_2$ is selected from the group consisting of —O—, —S—, —C(O)O— and —C(O)NH; n ranges from about 1-3; x ranges from about 1-10; and y ranges from about 1-4.

10. The brightness enhancing film of claim 9 wherein the first surface treatment is selected from the group consisting of 2-[2-(2-methoxyethoxy)ethoxy]acetic acid, 2-(2-methoxyethoxy)acetic acid, succinic acid mono-[2-(2-methoxyethoxy)-ethyl]ester, maleic acid mono-[2-(2-methoxyethoxy)-ethyl]ester, glutaric acid mono-[2-(2-methoxyethoxy)-ethyl]ester, succinic acid mono-2-[2-(2-methoxyethoxy)ethoxy]ethyl ester, and mixtures thereof.

11. The brightness enhancing film of claim 1 wherein the second surface treatment is selected from the group consisting of succinic acid mono-(2-acryloyloxy-ethyl)ester, maleic acid mono-(2-acryloyloxy-ethyl)ester, glutaric acid mono-(2-acryloyloxy-ethyl)ester, maleic acid mono-(4-acryloyloxy-butyl)ester, succinic acid mono-(4-acryloyloxy-butyl)ester, and glutaric acid mono-(4-acryloyloxy-butyl)ester.

12. The brightness enhancing film of claim 1 wherein the amount of inorganic nanoparticles ranges from 40 wt. % to 60 wt. % of the polymerizable resin composition.

13. The brightness enhancing film of claim 1 wherein the inorganic nanoparticles have a refractive index of at least 1.68.

14. The brightness enhancing film of claim 13 wherein the inorganic nanoparticles consist of zirconia.

15. A brightness enhancing film having a polymerized structure comprising the reaction product of a polymerizable resin composition comprising
    an organic component comprising one or more monofunctional biphenyl monomers in an amount of at least 10 wt. % of the organic component; and
    at least 10 wt. % of the polymerizable resin composition comprises inorganic nanoparticles surface modified with a first and second surface treatment
        the first surface treatment comprising at least one monocarboxylic acid having a polyether group, and
        the second surface treatment comprising at least one acrylate functionalized surface modifier prepared by the reaction of an aliphatic anhydride and a hydroxy alkyl acrylate.

16. The brightness enhancing film of claim 15 wherein the first surface treatment has the formula:

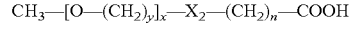

wherein $X_2$ is selected from the group consisting of —O—, —S—, —C(O)O— and —C(O)NH; n ranges from about 1-3; x ranges from about 1-10; and y ranges from about 1-4.

17. The brightness enhancing film of claim 16 wherein the first surface treatment is selected from the group consisting of 2-[2-(2-methoxyethoxy)ethoxy]acetic acid, 2-(2-methoxyethoxy)acetic acid, succinic acid mono-[2-(2-methoxyethoxy)-ethyl]ester, maleic acid mono-[2-(2-methoxyethoxy)-ethyl]ester, glutaric acid mono-[2-(2-methoxyethoxy)-ethyl]ester, succinic acid mono-2-[2-(2-methoxyethoxy)ethoxy]ethyl ester, and mixtures thereof.

18. The brightness enhancing film of claim 15 wherein the second surface treatment is selected from the group consisting of succinic acid mono-(2-acryloyloxy-ethyl)ester, maleic acid mono-(2-acryloyloxy-ethyl)ester, glutaric acid mono-(2-acryloyloxy-ethyl)ester, maleic acid mono-(4-acryloyloxy-butyl)ester, succinic acid mono-(4-acryloyloxy-butyl)ester, and glutaric acid mono-(4-acryloyloxy-butyl)ester.

19. The brightness enhancing film of claim 15 wherein the amount of inorganic nanoparticles ranges from 40 wt. % to 60 wt. %.

20. The brightness enhancing film of claim 15 wherein the inorganic nanoparticles have a refractive index of at least 1.68.

* * * * *

UNITED STATES PATENT AND TRADEMARK OFFICE
CERTIFICATE OF CORRECTION

PATENT NO. : 8,530,572 B2
APPLICATION NO. : 13/534382
DATED : September 10, 2013
INVENTOR(S) : Brant U Kolb Page 1 of 1

It is certified that error appears in the above-identified patent and that said Letters Patent is hereby corrected as shown below:

In the Specification

Column 9
Line 2, Delete "novolak" and insert -- novolac --, therefor.
Line 63, Delete "AlfaAeser" and insert -- AlfaAesar --, therefor.

Column 10
Line 10, Delete "bromine In" and insert -- bromine. In --, therefor.

Column 19
Line 53, Delete "my be" and insert -- may be --, therefor.

Column 23
Line 22, Delete "Darocure" and insert -- Darocur --, therefor.
Line 49, Delete "Darocure" and insert -- Darocur --, therefor.

Column 24
Line 7, Delete "Darocure" and insert -- Darocur --, therefor.

Column 25
Line 9, Delete "Darocure" and insert -- Darocur --, therefor.

Signed and Sealed this
Eleventh Day of March, 2014

Michelle K. Lee
*Deputy Director of the United States Patent and Trademark Office*